United States Patent [19]

Dalrymple et al.

[11] Patent Number: 5,243,414
[45] Date of Patent: Sep. 7, 1993

[54] COLOR PROCESSING SYSTEM

[75] Inventors: John C. Dalrymple, Portland; Patrick E. Welborn, Lake Oswego; Christopher D. Shaver, Tigard, all of Oreg.

[73] Assignee: Tektronix, Inc., Wilsonville, Oreg.

[21] Appl. No.: 737,004

[22] Filed: Jul. 29, 1991

[51] Int. Cl.⁵ .................................. H04N 1/46
[52] U.S. Cl. ........................ 358/500; 358/518
[58] Field of Search ............ 358/75, 76, 78, 80, 358/21, 30

[56] References Cited

U.S. PATENT DOCUMENTS

| | | | |
|---|---|---|---|
| 4,397,292 | 4/1983 | Minato et al. | 340/701 |
| 4,409,614 | 10/1983 | Eichler et al. | 358/76 |
| 4,425,417 | 1/1984 | Ingalls et al. | 430/30 |
| 4,500,919 | 2/1985 | Schreiber | 358/78 |
| 4,670,780 | 6/1987 | McManus et al. | 358/80 |
| 4,721,951 | 1/1988 | Holler | 358/80 |
| 4,758,885 | 7/1988 | Sasaki et al. | 358/80 |
| 4,843,573 | 6/1989 | Taylor et al. | 346/521 |
| 4,875,032 | 10/1989 | McManus et al. | 340/703 |
| 5,077,606 | 12/1991 | Hatabe et al. | 358/75 |

OTHER PUBLICATIONS

"Digital Display and Printing of Color Images based on Uniform Color Space," Ronald S. Gentile, Jan P. Allebach, and Eric Walowit, Purdue University, West Lafayette, Indiana, published prior to Jul. 29, 1991.

"Postscript Language Reference Manual," Second Edition, Adobe Systems, Inc., 1990, Addison-Wesley Pub. Co., Inc., pp. 150–193 and 293–309.

"Background Information PostScript Level 2 and Tek-Color Technology," Tektronix, Inc., prepared Jul. 1991, published Aug. 1991.

"A Method for Matching Hardcopy Color to Display Color," Paul McManus and Greg Hoffman, SID 85 Digest, Society for Information Display, 1985.

"Device Independent Color Rendition," E. K. Zeise and H. R. Buitano, presented at the 4th International Congress in Non-Impacting Printing Technologies, New Orleans, La., Apr. 25, 1988.

"A Comparison of Techniques for Color Gamut Mismatch Compensation," Ronald S. Gentile and Jan P. Allebach, SPIE vol. 1077, 1989.

"Accurate Color Reproduction for Computer Graphics Applciatios," Bruce J. Lindbloom, Computer Graphics, vol. 23, No. 3, Jul. 1989, pp. 117–126.

*Primary Examiner*—Edward L. Coles, Sr.
*Assistant Examiner*—Jerome Grant, II
*Attorney, Agent, or Firm*—John D. Winkelman; Ann W. Speckman

[57] ABSTRACT

A color processing system is provided that specifies color in a standardized, perceptually uniform color space and resolves color differences between input and/or output devices. The color processing system utilizes a color mapping techniques to adjust the results of color mapping to fit the color gamut of the output device. The color processing system may be implemented as a color rendering dictionary in a PostScript ® Level 2 interpreter. An additional feature involves adaptation of PostScript ® Level 1 applications to take advantage of the improved color processing system and PostScript ® Level 2 flexibility.

18 Claims, 6 Drawing Sheets

COLOR PROCESSING SYSTEM

TECHNICAL FIELD

The present invention involves a color processing system that provides output having improved color characteristics, and relates more particularly to a color processing system that cooperates with an output device to produce output having enhanced color characteristics from user expectation and aesthetic points of view.

BACKGROUND OF THE INVENTION

In color printing or other types of color reproduction applications, color information must be communicated between a source (e.g., an input device) and an output device (e.g., a video monitor, color printer or printing press) such that the output device produces an image that is related to the source information regarding the image. Frequently, multiple output devices, such as display terminals and printers, communicate with a common input source, and perhaps with each other, during generation or reproduction of an output image. Inaccurate transfer or translation of input information to the output device results in inaccurate and unacceptable output images.

Output color quality is difficult to define and to achieve. Moreover, desired quality attributes generally vary from application to application. Users typically characterize desirable color quality as "clear," "bright," "high resolution," "smooth" and "accurate." An image may be considered to be of inadequate quality if: (1) the printed colors fail to look like the colors appearing on the display screen; (2) the printed colors fail to look like a standard set of colors; or (3) the printed colors fail to look like the colors produced by an offset printer. Printed output should at least correspond predictably to and, in some cases, accurately replicate the image created on, for example, a video display terminal.

Production of high quality printed output involves more than colorimetric accuracy. The user wants the output colors to look like he or she subjectively intends them to look. Color printer users' intent may vary depending on the particular application. For example, a user who is producing transparencies or the like for overhead presentations generally prefers bright, "pleasing" colors that are similar to those displayed on a CRT (with which the user probably designed the images). In the production of proofs of digitally edited scanned photographs, a user may want a precise reproduction of the displayed image. Another user, who is producing graphic designs that will ultimately be reproduced in large quantities by a printing press, is generally less concerned that the printed colors match the displayed colors. Instead, such a user wants the printer output to accurately represent the ultimate printing press output. Producing high quality color output, even if it could be objectively defined, is technically complex as a result of the various ways color is produced by output devices and the way software specifies what color is to be produced.

Video display terminals typically employ cathode ray tube (CRT) technology. A CRT is a raster device displaying images composed of thousands of pixels. For each pixel on the screen, triads of phosphor dots are provided. Each triad comprises three phosphor dots, one emitting each of the primary red, blue and green colors. CRT's thus utilize the additive primary colors red, green and blue (RGB). Color hues are produced by illuminating one or more of the phosphor dots in a triad. Additionally, the CRT can vary the intensity of the electron beam illuminating the phosphor dots to produce hues having more or less saturation and luminance. In this manner, high end workstations and terminals may provide palettes of 16 million or more shades of color.

Video RGB color is represented as a cube-shaped signal space having a black point at one corner and a white point at the diagonally opposing corner. The black point corresponds to the absence of emissions from all three phosphors, while the white point corresponds to the combined full intensity emissions of all three phosphors. Emanating from the black point in a mutually orthogonal relationship (i.e., in a cartesian coordinate system), three axes correspond to the red, green and blue phosphor intensities, respectively. Each axis terminates at the full intensity of the associated phosphor. Coordinates commonly referred to as "DAC values" are denominated along each axis. DAC values are numerical values corresponding to the electron gun control level required to illuminate a phosphor at a particular intensity. DAC values can be specified to generate any color in the cube-shaped RGB signal space.

Video RGB color selection is widely used because it is readily correlated to the hardware, i.e., the electron guns and associated drive circuitry, implemented in CRT displays. It is important to note, however, that the video RGB color does not provide a perceptually uniform color space. That means that at various locations within the RGB color cube, a selected change in the DAC values does not necessarily result in an equivalent perceived change in the displayed color. For example, changing the DAC values by n units in one region may not result in any perceived color change, while changing DAC values by n units in another region may yield a substantial perceived color change.

The perceptual nonuniformity of video RGB color is partly a result of the non-linearity of the CRT device and partly a result of the non-linearity of human vision in perceiving the color spectrum. The effect of this perceptual nonuniformity is that it is difficult for the user to specify colors and to accurately predict the output color for any change in input DAC values.

Color printers for computer graphics applications are typically raster devices that produce images using patterns of small ink dots. Conventional color printers, such as bi-level ink jet printers or thermal wax printers use three primary colorants—cyan, magenta, and yellow (CMY)—and frequently use black (K) as well. Cyan, magenta and yellow are referred to as subtractive primaries because the colorants act as filters that subtract or absorb certain light wavelengths and pass others. The primary colorants may be combined on a printing substrate to produce the binary colors red, green and blue. Color printers typically employ a dot-or-no-dot process using an eight color palette.

Differences in colorants, color signals, capabilities and color generation methods characteristic of display devices (e.g., CRT's) and color printers result in unpredictable color output. In more nearly perfect systems, the printed image would be a substantial duplicate or would correspond predictably to the displayed image. In practice, however, substantial duplication, or even a predictable correspondence between the displayed and printed images is difficult to attain.

Other differences in the nature of the color output—the CRT emits light, while printed substrates such as paper reflect light—exacerbate perceived color differences. Moreover, as a result of the differences in how the color information is specified and the output devices produce color, there are some displayed colors that a printer is incapable of reproducing and, conversely, there may be some printed colors that the display device is incapable of displaying. The range of color that a particular device is capable of printing is referred to as its gamut. Each output device has a characteristic color gamut. Differences in color gamut between various technologies and devices make precise color matching impossible.

Mapping colors from one device to another involves graphics software. Conventional color graphics software uses device-dependent color signals that describe primary colors and mixtures (e.g., RGB, CMYK) to the output device. Because RGB and CMYK values produce different colors on particular video monitors and printers, respectively, the actual color rendered, and hence the quality perceived by the user, depends on the particular output device.

Image processing comprehends a wide variety of manipulations that may take place during or after generation of an image. The image processing described herein relates to the specialized way that signals are processed by graphics software to compensate for the differences between various input and output devices such as display devices and printers. A technique known as dithering enables printers, despite the constraint of constant dot size and the lack of cost-effective variable intensity dots, to expand their palettes to millions of shades of color. Dithering does not, however, perform color matching functions to achieve correspondence between colors displayed on a display device and colors designated from the printer's palette. Additional color matching capability is especially important for users working in areas such as graphic arts, presentations, and professional publishing, where output color quality is of paramount importance.

Several systems have been developed to define colorimetric parameters and characterize perceptually uniform color spaces. The most prominent international standards for color specification are collectively termed the CIE System (Commission Internationale de l'Eclairage, or International Commission on Illumination). A useful explanation of color, the CIE system and color spaces is provided in Billmeyer & Saltzman, *Principles of Color Technology*, (2nd ed. 1981).

RGB signals designate the coordinates for three component values that may be combined to produce any color within the RGB signal space. CIE color matching functions x, y, and z may be derived from RGB color matching functions. The x, y, and z functions are used directly in the derivation of appropriate CIE X, Y, and Z tristimulus values (hereafter, "XYZ" values) for a color. Derivation of XYZ values is well known.

The XYZ values of the spectral colors have been converted into a two-dimensional color map known as the 1931 CIE chromaticity diagram. The chromaticity coordinates x and y are derived by calculating the ratios of the respective X and Y tristimulus values to the sum of X, Y, and Z values of that color. The x and y chromaticity coordinates for any real color are located within an area defined by the spectral locus and a line joining the ends of the spectral locus. The 1931 CIE chromaticity diagram is actually representative of three-dimensional color, with the third dimension Y (luminance) orthogonal to and lying above the x, y plane.

The three-dimensional color specification system just described is known as the CIExyY system. Any real color can be specified in terms of the CIExyY color specification system and directly related to the particular CIE XYZ values. The CIExyY system is a widely accepted method for specifying color. Further, data expressed in terms of the 1931 CIE chromaticity diagram is valuable because it can be used to predict the color resulting from a mixture of two or more colors. Addition of XYZ values of individual colors yields the XYZ values of the resulting mixed color.

Efforts have been made to transform the CIE color specification standard into perceptually uniform color spaces, while preserving the additive mixing feature of the 1931 CIE chromaticity diagram. Both linear and nonlinear transformations of the CIE System have been proposed to provide a more nearly perceptually uniform color space. Nonlinear transformations of the CIE XYZ System include a two dimensional uniform chromaticity diagram (known as the CIE 1976 UCS diagram), having u' and v' coordinates that approximate a perceptually uniform color plane. The u' and v' coordinates are directly related to the x and y chromaticity coordinates (hence, to the XYZ values). The diagram defined by the u' and v' coordinates has been mathematically converted to a color space referred to as CIELUV that approximates perceptual uniformity. All the coordinates of the CIELUV system are directly related, via the CIExyY system to the CIE XYZ values.

Despite the relatively successful attempts to define a substantially uniform color space, efforts to match color signals from different output devices and to produce printed output having predictable, high quality color characteristics have produced generally less than satisfactory results.

SUMMARY OF THE INVENTION

The present invention contemplates a color processing system that resolves differences among input and/or output devices such as video displays and color printers to produce high quality color output. The color processing system specifies color in a standardized, device-independent fashion and manipulates color information based on certain aesthetic judgments and standards to provide color output having higher quality color characteristics. Color processing may be implemented in an interpretive device that, in conjunction with a color printer, produces output having enhanced color characteristics as measured by the user's expectations or predetermined aesthetic standards.

Color processing according to the present invention involves at least two functions: first, a color mapping technique is developed to map device-dependent signals (e.g., RGB) to a perceptually uniform color space; and second, a gamut mapping strategy is developed to adjust the results of color mapping to fit the capabilities, i.e., color gamut, of the output device. The color mapping aspect of the color processing system may be designed to provide the user with a choice of color processing schemes that permits the user to generate color output in accordance with his or her own aesthetic expectations.

Each of the color processing functions, namely color mapping and gamut mapping, provides advantages independent of one another and is thus independently adaptable for various applications. The color processing techniques may also be used in combination to provide, e.g., an interpretive color rendering function. According to an especially preferred embodiment, both the color mapping and gamut mapping functions of the color processing system are provided as at least part of the color rendering dictionary in a PostScript ® Level 2 interpreter. An additional feature of the color processing system of the present invention provides PostScript ® Level 2 color processing capabilities for PostScript ® Level 1 applications.

BRIEF DESCRIPTION OF THE DRAWINGS

The above-mentioned and additional features of the present invention and the manner of obtaining them will become apparent, and the invention will be best understood by reference to the following more detailed description, read in conjunction with the accompanying drawings, in which.

DESCRIPTION OF PREFERRED EMBODIMENTS

The color processing system of the present invention involves the dual functions of color mapping and gamut mapping to provide an output image having improved color characteristics. More specifically, the present invention provides processing of color information to accommodate the limitations of particular output devices. Aesthetically consistent images are obtained in the practice of the present invention by converting an input, device dependent signal into standardized, perceptually uniform color space information; processing the standardized color information; and then converting the standardized, processed color information to a device dependent output signal.

Preferred embodiments of the color processing system of the present invention are described with reference to a system including an input device and/or interactive graphics software that permit specification by a user, directly or indirectly, of color text, images, or the like; a display device in communication with the input device for displaying the specified text/images in an RGB format; and a color printer output device in communication with the input and/or display device for printing the text/images specified by the input device and displayed on the display device in a CMYK format. The color processing system of the present invention is equally applicable to other types of color input or output devices such as printing presses, image scanning devices, film recorders, color liquid crystal displays, other types of color displays, and the like.

Color mapping and gamut mapping in accordance with the present invention utilize a perceptually uniform color space designated as HVC in the polar coordinate system and PQV in the cartesian coordinate system. It is important to note that the color processing system of the present invention could be adapted to utilize any perceptually uniform color space, such as CIELAB, CIELUV, and the like.

Figure 1:
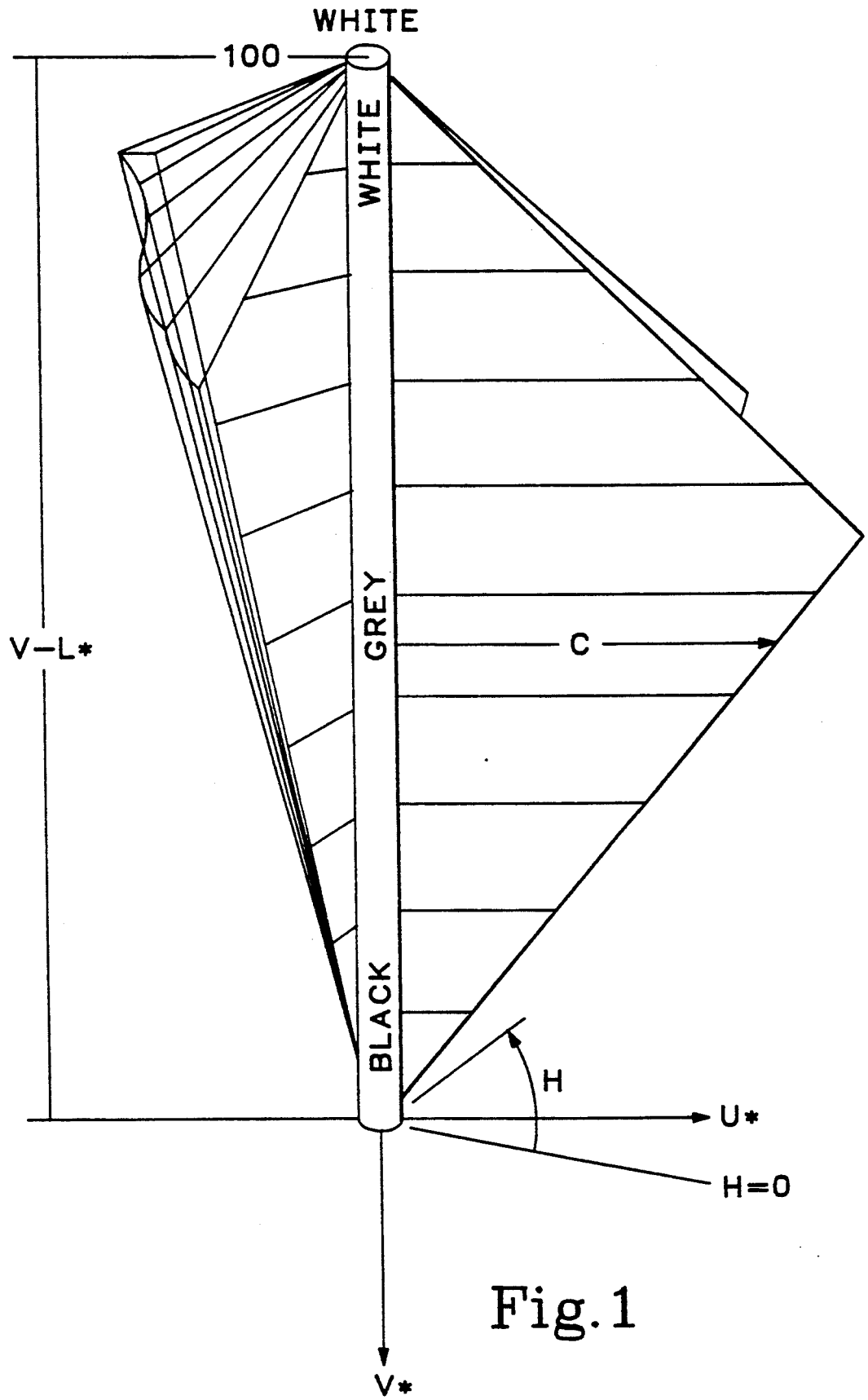
FIG. 1 schematically illustrates the perceptually uniform HVC color space.

HVC color space is based upon CIE standards and was developed to provide enhanced perceptual uniformity. A schematic diagram illustrating HVC color space is shown in FIG. 1. The H and V coordinates in HVC color space substantially correspond to the CIELUV hue angle and metric lightness function $L^*$, respectively, as shown. For any selected color producible by an output device, upon determination of the corresponding XYZ values, and transformation of those values into the CIELUV $L^*$, $u^*$ and $v^*$ coordinates, the H and V coordinates in HVC space can be computed.

The coordinate C in HVC color space, representing the chroma of the color, is a substantially modified version of the CIELUV chroma coordinate $C^*_{uv}$. The C coordinate in HVC space is scaled to by a chroma factor $C_f$, which defines the C coordinate within the maximum achievable chroma values of an output device. The scaling is achieved by defining the chroma factor $C_f$ as $C_f = 100/$maximum chroma $C^*_{uv}$ for the output device. An important aspect of HVC color space, therefore, is that the chroma coordinate C correlates to the gamut of colors that can be produced by the output device.

Input device color information, e.g., RGB signals, is converted to a perceptually uniform color space to facilitate rendering of high quality, aesthetically pleasing output color images. The color mapping and gamut mapping functions therefore operate in HVC color space or an equivalent, cartesian coordinate PQV color space. PQV color space is related to the polar coordinate HVC color space as follows:

$$P = C * COS(H)$$

$$Q = C * SIN(H)$$

$$V = V$$

Color mapping is one aspect of color processing according to the present invention. In a color mapping operation, an input color signal from one device is mapped to a corresponding color signal in a perceptually uniform color space. In the specified system, therefore, video RGB signals are mapped onto a perceptually uniform color space such as PQV.

The color mapping function typically involves an initialization protocol that correlates a set of input color signals from one device to coordinates in a perceptually uniform color space corresponding to output colors. The first step in the initialization protocol is the selection of the set of correspondences, or "tack points." Tack points, for the purposes of the present invention, are points that define a color as well as the boundaries of sectors of color space. Tack points are identified in both source signal space and perceptually uniform PQV color space. A set of corresponding colors is therefore defined in source signal space and PQV color space, forming the basis for accurate color translations.

Tack points may be selected visually, colorimetrically, or in any other fashion that establishes a correspondence between input color signals and output colors. Tack points may be selected visually by comparing a color in the source image (e.g., a displayed image) to the color palette of an output device and assigning a color in the output device palette to a color in the source image. Tack points may be selected colorimetrically by comparing the numerical value of a selected color in the source image and assigning an output device color corresponding to that numerical value. Each tack point therefore represents a 1:1 correspondence between the source and output color, whether the correspondence is based upon visual inspection, matched colorimetric values, color modeling functions, or the like.

The selection of tack points, or correspondences, forms part of the initialization protocol and is typically embedded in color processing hardware or software. It may be desirable for some applications, however, to permit the user to initialize the color mapping function by making his or her own tack point correspondence selections. In this fashion, the user would have the flexibility to specifically tailor the color mapping functions to various applications and to his or her own aesthetic preferences.

In accordance with preferred color processing systems of the present invention, tack points are selected in accordance with aesthetic user expectations. Business graphics applications, for example, require highly saturated colors and clean lines. Tack points and correspondences are selected to produce highly saturated output colors for these applications. Different color characteristics are desirable for color imaging or shading applications and, therefore, a different set of tack points is preferably selected for such applications. A plurality of tack point sets may be provided to allow a user to accommodate aesthetic concerns for a variety of different applications.

The number of tack points designated in each set for which a 1:1 correspondence between input and output color is established may vary. Eight or more tack points are preferably established when applications involve color mapping between an RGB source device, e.g., a video display terminal, and a CMYK color printer. In this fashion, tack points can be established for each of the primaries and binaries (RGBCMY) as well as black and white. Specification of a larger number of tack points provides greater ability to fine tune the output color in accordance with the predetermined correspondences. Fewer than eight tack points may be selected for particular applications. Although color mapping has been described with reference to video RGB source signals, it will be recognized that other source signals may be processed in this fashion. RGB (red, green, blue), Grey, HSB (hue, saturation, brightness) and CMYK (cyan, magenta, yellow, black) are examples of source signal space that may be processed in accordance with the present invention.

Tack point designation is described below in terms of RGB source signal space and PQV perceptually uniform color space. Eight tack points were selected corresponding to the source signals for black (K), white (W), red (R), yellow (Y), green (G), cyan (C), blue (B) and magenta (M). The RGB source signal and PQV color space coordinate correspondence is set forth below in Table I.

TABLE I

| Source Signal | Point | RGB Coordinates | Mapped Color Point | PQV Coordinates |
|---|---|---|---|---|
| Black | K | (0, 0, 0) | K' | $(P_k, Q_k, V_k)$ |

TABLE I-continued

| Source Signal | Point | RGB Coordinates | Mapped Color Point | PQV Coordinates |
|---|---|---|---|---|
| White | W | (1, 1, 1) | W' | $(P_w, Q_w, V_w)$ |
| Red | R | (1, 0, 0) | R' | $(P_r, Q_r, V_r)$ |
| Green | G | (0, 1, 0) | G' | $(P_g, Q_g, V_g)$ |
| Blue | B | (0, 0, 1) | B' | $(P_b, Q_b, V_b)$ |
| Cyan | C | (0, 1, 1) | C' | $(P_c, Q_c, V_c)$ |
| Magenta | M | (1, 0, 1) | M' | $(P_m, Q_m, V_m)$ |
| Yellow | Y | (1, 1, 0) | Y' | $(P_y, Q_y, V_y)$ |

The second step of the color mapping initialization protocol involves generation of matrices for transforming source signal information to color space. The number of conversion matrices required for this transformation is equivalent to the number of sector volumes defined in the initialization protocol which, in turn, is related to the number of tack points selected. Sectors can be visualized as volumes of space bounded by four tack points, two of which correspond to black and white.

Figure 2:
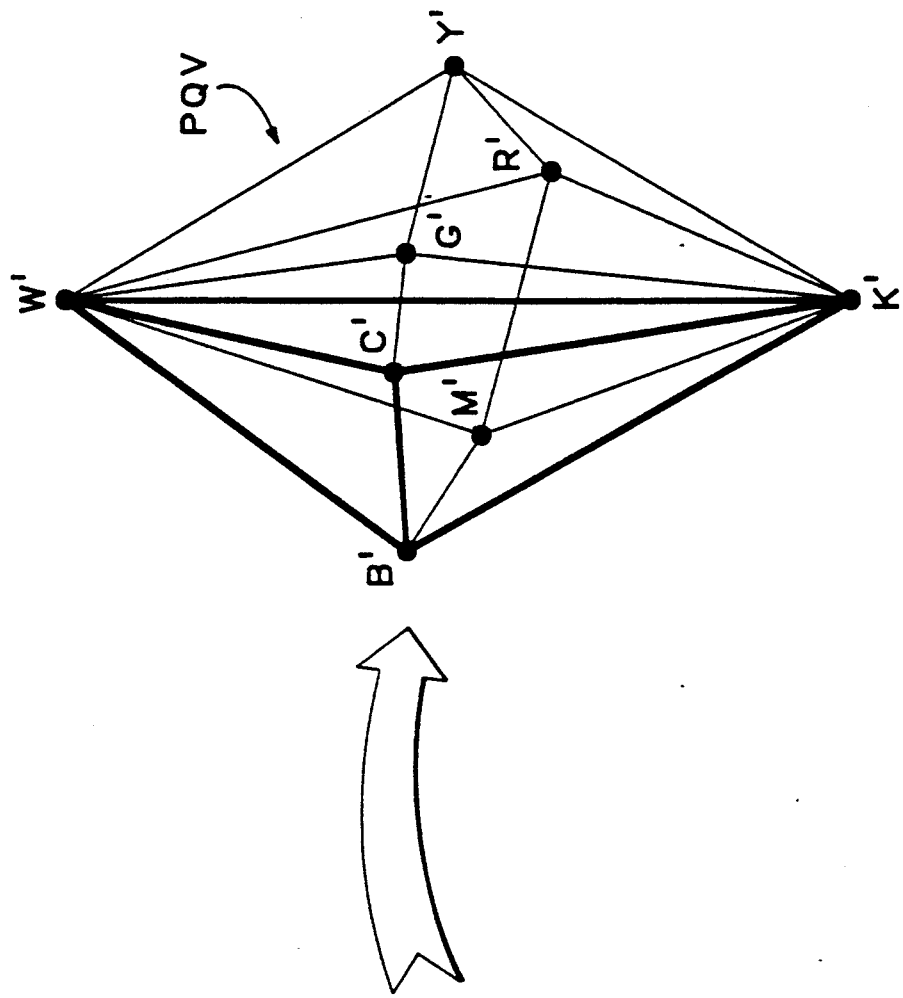
FIG. 2 illustrates the correspondence between sectors designated by RGB source signals and sectors mapped in perceptually uniform PQV color space.
Figure 2:
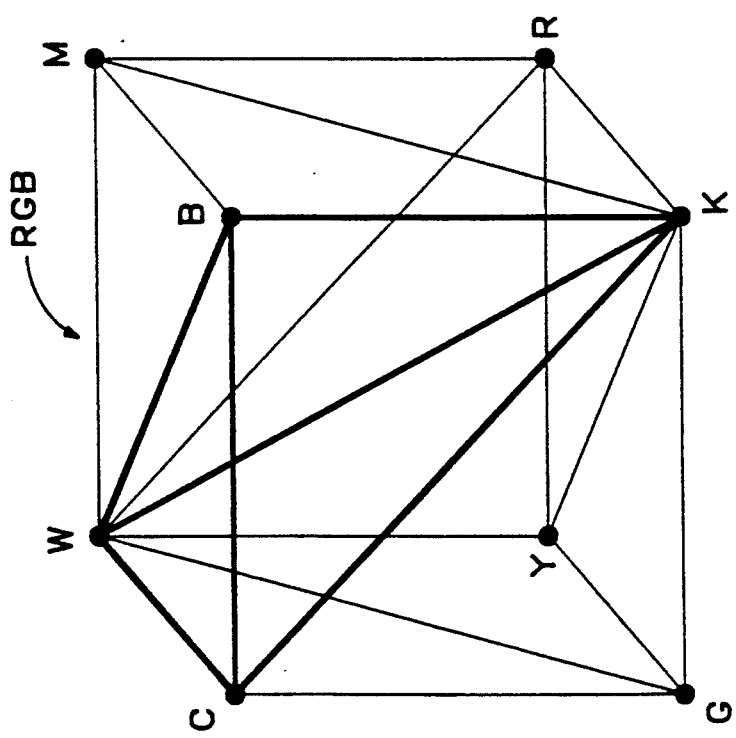

As illustrated in FIG. 2, the RGB color cube is sectorized as a plurality of tetrahedra, with four tack points (white, black, a primary and an adjacent binary) forming the vertices. There are therefore six sectors in an RGB color mapping scheme using eight tack points. In the eight tack point example described above, the six sectors could be designated as KWRY, KWYG, KWGC, KWCB, KWBM and KWMR.

A conversion matrix is generated corresponding to each sector. In the exemplary embodiment, the matrix for the KWRY sector is as follows:

| $P_r$ | $P_y-P_r$ | $P_w-P_y$ |
|---|---|---|
| $Q_r$ | $Q_y-Q_r$ | $Q_w-Q_y$ |
| $V_r$ | $V_y-V_r$ | $V_w-V_y$ |

The KWGC and KWBM matrices are generated in the same way as the KWRY matrix. The matrix for the KWYG sector of the illustrative embodiment is as follows:

| $P_y-P_g$ | $P_g$ | $P_w-P_y$ |
|---|---|---|
| $Q_y-Q_g$ | $Q_g$ | $Q_w-Q_y$ |
| $V_y-V_g$ | $V_g$ | $Q_w-Q_y$ |

The KWCB and KWMR matrices are generated in the same way as the KWYG matrix.

The matrices described above function to convert source color signals to desired output coordinates in a perceptually uniform color space. In mathematical terms, Matrix * $rgb_{in}$ = $PQV_{out}$. The matrix transformation thus functions to map sector volumes in the RGB signal space to corresponding sector volumes in the perceptually uniform PQV color space, as illustrated in FIG. 2. The darkened lines in FIG. 2 illustrate the blue-cyan RGB color cube sector (KWCB) and the corresponding K'W'C'B' sector in the PQV color space.

Matrices corresponding to the sectors defined by the selected tack points are preferably generated as part of the initialization protocol and imbedded in the hardware or software. Once tack point selection and matrix generation have been completed, source signals can be converted to perceptually uniform color coordinates using the color mapping function, as shown schematically in FIG. 3.

During color processing, a source signal representative of a particular color is first classified by the color mapping system in a specific color sector in the RGB color cube. After a source signal has been categorized in a particular sector, it is transformed to a corresponding sector in PQV color space using the matrix transform corresponding to that sector.

Figure 3:
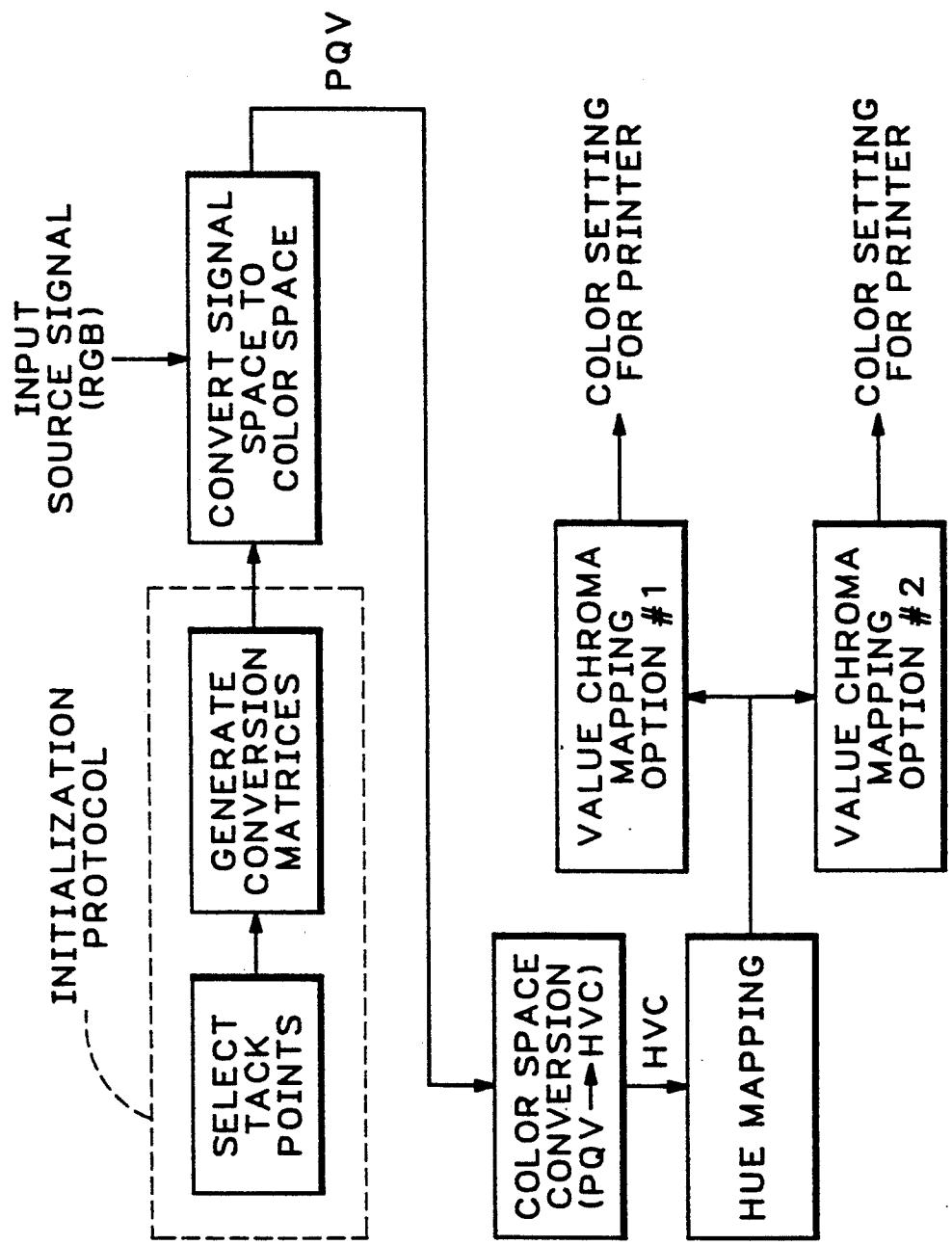
FIG. 3 illustrates a simplified flow diagram describing the color mapping and gamut mapping functions of color processing to the present invention.

After the source color signal has been converted to a perceptually uniform color space (e.g., PQV), the gamut mapping function of the color processing system of the present invention is implemented. As shown in FIG. 3, cartesian PQV color space coordinates may be converted to the equivalent polar HVC coordinates prior to gamut mapping. The equations relating PQV and HVC color space are set forth above, and points in one color space can be easily converted into points in the other using those relationships.

Gamut mapping in accordance with the present invention involves two steps: hue mapping and value/chroma mapping. These steps are independent of one another. Hue mapping is preferably conducted first, in a polar coordinate color space, such as HVC color space.

For the purposes of hue mapping, the hue circle is divided into portions in any convenient manner. For example, the hue circle may be partitioned into equal numbers of degrees (e.g., six portions of 60 degrees each), according to the colors desired as endpoints of hue portions, or the like. End points are identified in much the same fashion as tack points. They may be selected visually, colorimetrically, or in any other fashion that establishes a correspondence between particular hues and points on the hue circle.

In the following discussion, the parameter $h_{tin}[n]$ is an ordered array of input hue portion endpoints for which the input hues map to output hues, where n is the number of points; $h_{tout}[n]$ in an ordered array of output hue portion endpoints for which the input hues map to output hues; $w[n]$ are weighting functions that weight or scale the mapping of hues; $h_{in}$ is an input hue angle for a color in a polar coordinate color space; $h_{out}$ is an output hue angle for a color in a polar coordinate color space; and the t parameter is the ratio defined below.

Hue mapping may be scaled according to any appropriate weighting functions. An exemplary set of weighting functions for the condition where n corresponds to the number of hue circle portions, e.g., $n=6$, is as follows:

$$w[1](t) = 1.0 * t$$

$$w[2](t) = 1.0 * t$$

$$w[3](t) = 1.0 * t$$

$$w[4](t) = 1.0 * t$$

$$w[5](t) = 1.0 * t$$

$$w[6](t) = 1.0 * t$$

The above set of weighting functions specifies a linear interpolation within each hue circle portion. Suitable non-linear weighting functions may also be specified, such as power functions or the like, that result in non-linear hue mapping. Appropriate mapping strategies and weighting functions to implement those strategies may be determined and implemented based upon the nature of the application involved.

Bounding input endpoints a and b are designated for which the relationship $h_{tin}[a] <= h_{in} <= h_{tin}[b]$ holds.

The parameter t may then be calculated using the following equation:

$$t = (h_{in} - h_{tin}[a])/(h_{tin}[b] - h_{tin}[a])$$

The t parameter indicates the position of the input hue angle relative to the bounding input hue circle portion endpoints. Since the output hue angle has a position relative to the bounding output hue circle portion endpoints that is proportional to the position of the input hue angle relative to the bounding input endpoints, the output hue angle may then be calculated using the following equation:

$$h_{out} = w[a](t) * (h_{tout}[b] - h_{tout}[a]) + h_{tout}[a]$$

Value/chroma mapping may also be performed as part of the gamut mapping procedure, as illustrated in FIG. 3. Several methodologies for value/chroma mapping may be implemented in the practice of the present invention. In fact, a user may be given value/chroma mapping options to permit the final image to more accurately comport with his or her own aesthetic expectations.

One preferred method of value/chroma mapping involves companding techniques, while an alternative method involves clipping techniques. As shown schematically in FIG. 3, value/chroma mapping option #1 utilizes companding techniques, while value/chroma option #2 utilizes clipping techniques.

For the purposes of the discussion of value/chroma mapping, L1 is the line described by the points $h_{out}, v_{in}, c_{in}$] and [0.0, 0.5, 0.0] in HVC color space. The second point [0.0, 0.5, 0.0] is chosen as the reference point for the purposes of illustration. Other points may be designated to define L1 to more closely match user expectations for specific applications.

In the following discussion, $v_{in}$ is the value of an input color and $v_{out}$ is the value of an output color in the HVC polar coordinate color space; $c_{in}$ and $c_{out}$ represent the chroma of input and output colors, respectively, in the HVC polar coordinate color space; p1 [$h_{out}, v_{p1}, c_{p1}$] is the point where L1 intersects the bounding surface of the color gamut of the input device; p2 is the point $h_{out}, v_{p2}, c_{p2}$] where L1 intersects the bounding surface of the color gamut of the output device; and tv is a parameter defined as set forth below.

A preferred companding procedure for chroma mapping may be represented as follows:

```
if v_in <= 0.5
    tv = (0.5 - v_in)/(0.5 - v_p1)
    v_out = 0.5 - tv * (0.5 - v_p2)
else
    tv = (v_in - 0.5)/(v_p1 - 0.5)
    v_out = 0.5 + tv * (v_p2 - 0.5)
c_out = (c_in/c_p1) * c_p2
```

In accordance with the companding version of value/chroma mapping described above, the input value is evaluated first. The output value determination depends upon whether the input value is less than, equal to, or greater than 0.5 i.e., the value reference point in the illustrative embodiment.) The output chroma depends upon both the input chroma and the chroma at points p1 and p2 where L1 intersects the input color gamut and the output color gamut, respectively.

A value/chroma mapping version using clipping techniques may alternatively be used in the gamut mapping process of the present invention. Using clipping techniques for value/chroma mapping, the input color space chroma and value parameters remain unchanged if those parameters map within the color gamut of the output device. If the input parameters do not map within the color gamut of the output device, the output parameters default to the chroma and value coordinates where L1 intersects the boundary of the output device color gamut. A suitable clipping procedure for use in the gamut mapping process of the present invention may be represented as follows:

$$\text{if } c_{in} >= c_{p2}$$
$$c_{out} = c_{p2}$$
$$v_{out} = v_{p2}$$
$$\text{else}$$
$$c_{out} = c_{in}$$
$$v_{out} = v_{in}$$

When the input and output color gamuts are similar, value/chroma mapping using clipping techniques is preferred. Likewise, clipping techniques are generally preferred for production of business graphics. Clipping tends to maximize color saturation. Alternatively, when images or smooth shading are to be produced, value/chroma mapping using companding techniques is generally preferred. Multiple value/chroma mapping capabilities are preferably embedded in output device hardware and software to allow a user to specify the value/chroma mapping technique preferred for a particular application.

As noted previously, mapping colors from one device to another involves graphics software that, conventionally, has described color to the output device in device dependant color signals (e.g., RGB and CMYK). The color processing system described above is especially suitable for use in applications and with interpreters based on the PostScript ® language. The PostScript ® language is an interpretive programming language with graphics capability that communicates a page description from a composition system to a printing system and controls the display of graphics information. The PostScript ® language page description is high level and device-independent.

Although the PostScript ® page description language is device-independent, the color information communication mechanism provided in PostScript ® Level 1 (PSL1) utilizes the device-dependent color signals RGB and CMYK. Some application software attempted to improve color accuracy by adjusting color signals in PostScript ® page descriptions for particular output devices, such as printing presses. Although improved color accuracy may be realized, these applications are both device and software dependent.

Figure 4A:
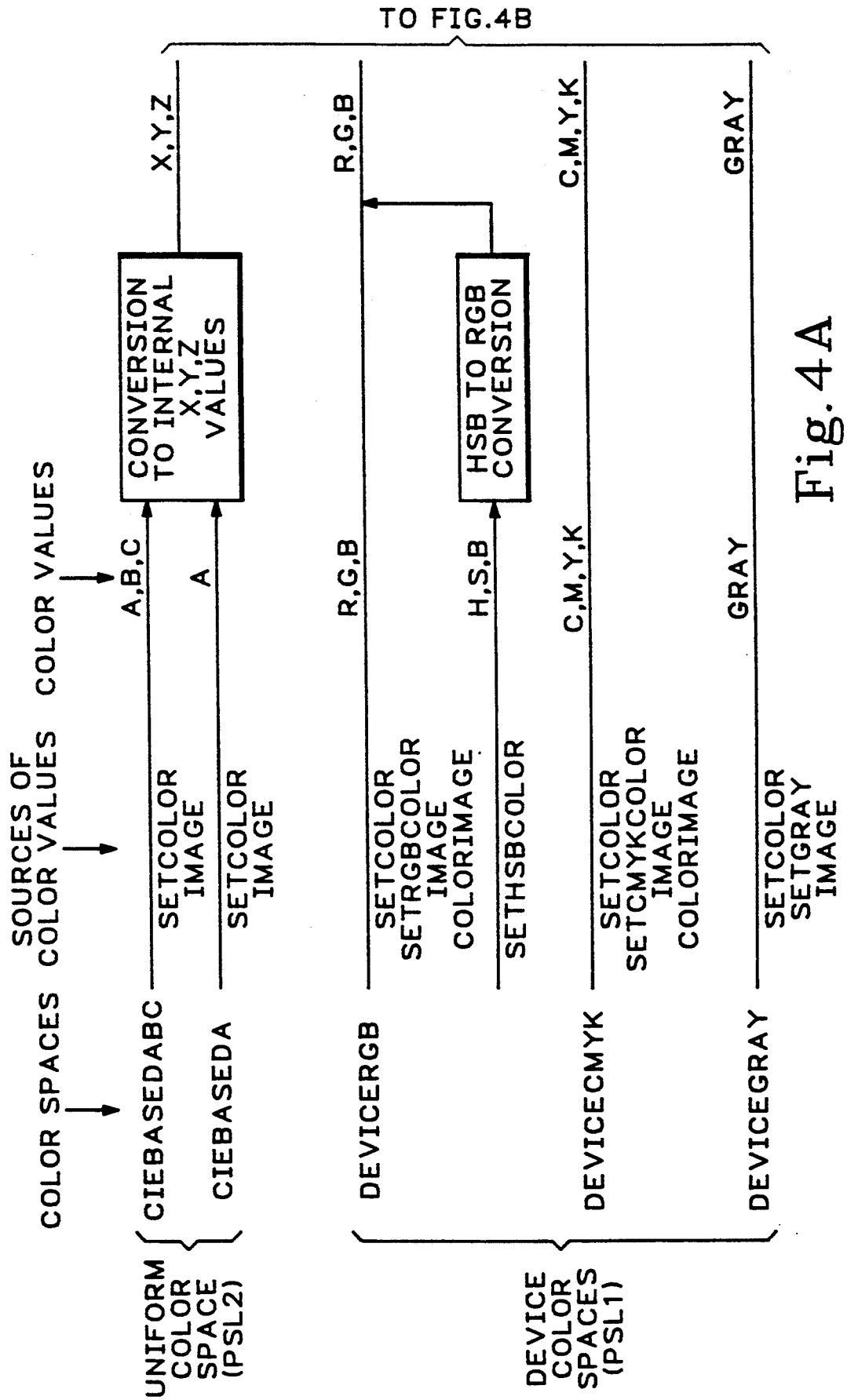
FIGS. 4A and 4B show a flow chart illustrating the color specification and color rendering aspects of PostScript ® Level 1 and Level 2 language programs.
Figure 4B:
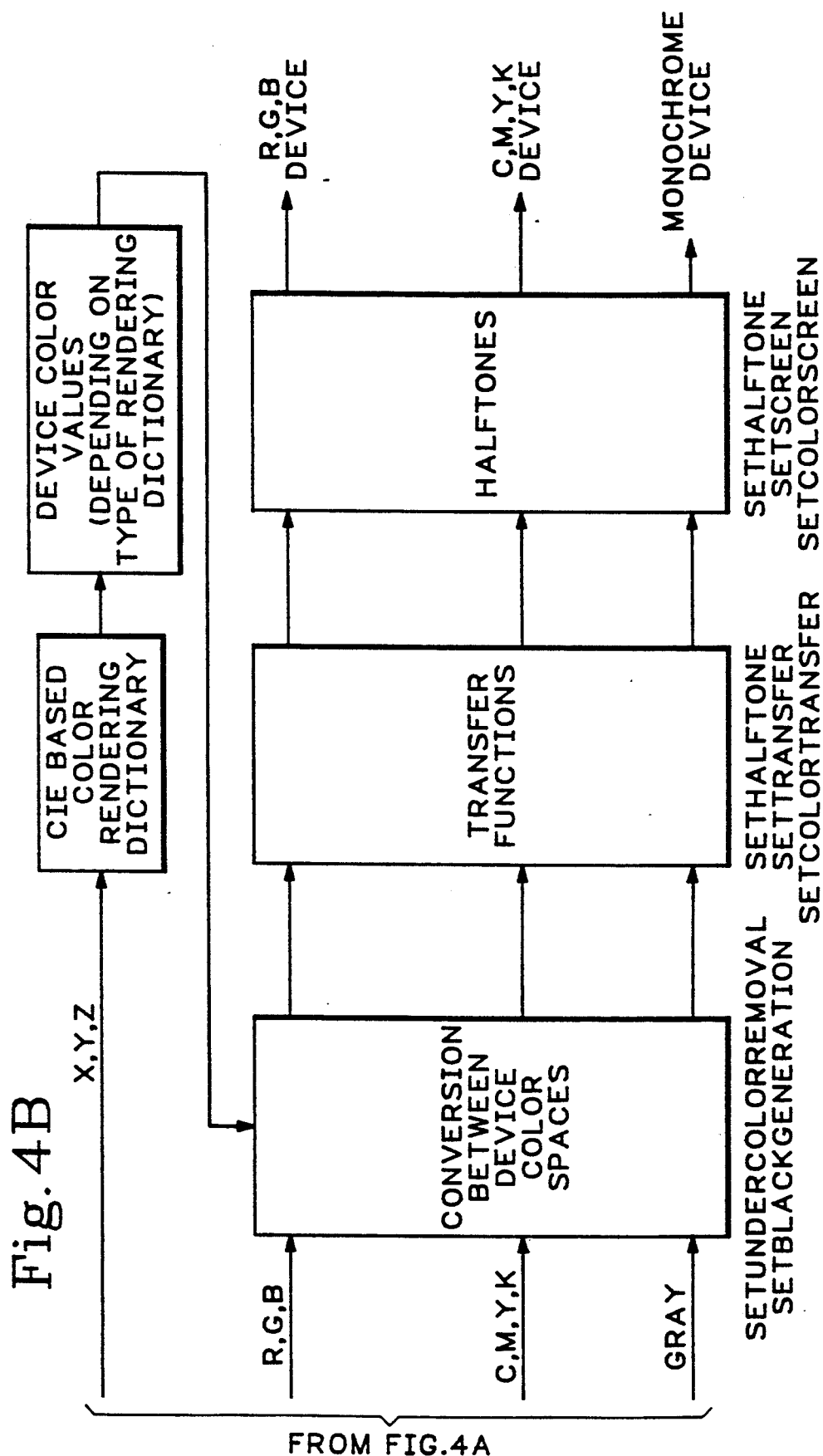

A schematic diagram illustrating the color specification and color rendering scheme provided in PSL1 and PSL2 language programs is shown in FIG. 4. PostScript ® Level 2 (PSL2) accommodates color specification in a plurality of color spaces, including RGB, CMYK, and CIE-based color systems. The PSL2 language thus provides a means for conveying device-independent color information (expressed in CIE-based color space) that can be interpreted with reference to a color rendering dictionary and produced by compatible color printers. PSL2 does not, however, prescribe procedures for developing color rendering dictionaries. Such interpretive functions are generally provided in conjunction with the color output devices.

The color processing system of the present invention, including color mapping and device gamut mapping functions, may thus be incorporated in the interpreter's color rendering dictionary. According to an especially preferred embodiment of the present invention, the color processing system provides at least part of the color rendering dictionary in a PSL2 interpreter.

The interpreter's color rendering dictionary may provide the user with a choice of color processing schemes that permits the user to model the color output in accordance with his or her own aesthetic expectations. A color rendering dictionary may be provided to support user-based, aesthetically oriented output instructions of a variety of types. For example, a "Blue Adjust" user selection corrects for the tendency of electronic color printers to print a purple color when blue was intended, without affecting other primary (C, M and Y) and secondary (R and G) color output. A "Blue Adjust" selection is typically based upon aesthetic signal to color correspondences. Such a simulation provides the brightest possible colors without undesirable color distortion.

Likewise, a "Simulate Video" user selection may be provided to specify an output image that simulates a video output color standard. A "Simulate Video" selection may be based upon modeled or aesthetically chosen signal to color correspondences. For example, a Tektronix PSL2-compatible printer provided with a specialized color rendering dictionary based upon a video model produces output images that simulate a video display conforming to CCIR Recommendation 709, with XA11 phosphor set, white point and a gamma of 2.2. Such a simulation generally provides the "best", highest quality color output for scanned images.

Similarly, a Simulate Press user selection may be provided to produce output image that simulates a printing press output standard, such as a four-color offset press using standard rotated halftone screens. A variety of other user selections may be specified and based upon various signal to color correspondences.

Source signals denominated in a variety of color identification systems may be input in PostScript ® applications. Prior to processing, the printer is set to a standardized CIE-basedABC color system recognized by PSL2. In addition, input representing various signal spaces is converted to a single working signal space, such as RGB space. For example, if both RGB and HSB values are provided as input to a PostScript ® application, the HSB values are converted to RGB and a standard CIE-basedABC color space is employed. CIE-basedABC color space is defined in terms of a two-stage, non-linear transformation of the 1931 CIE (XYZ) space. The color processing system of the present invention may be implemented as the CIE-based color rendering dictionary shown in FIG. 4.

Figure 5:
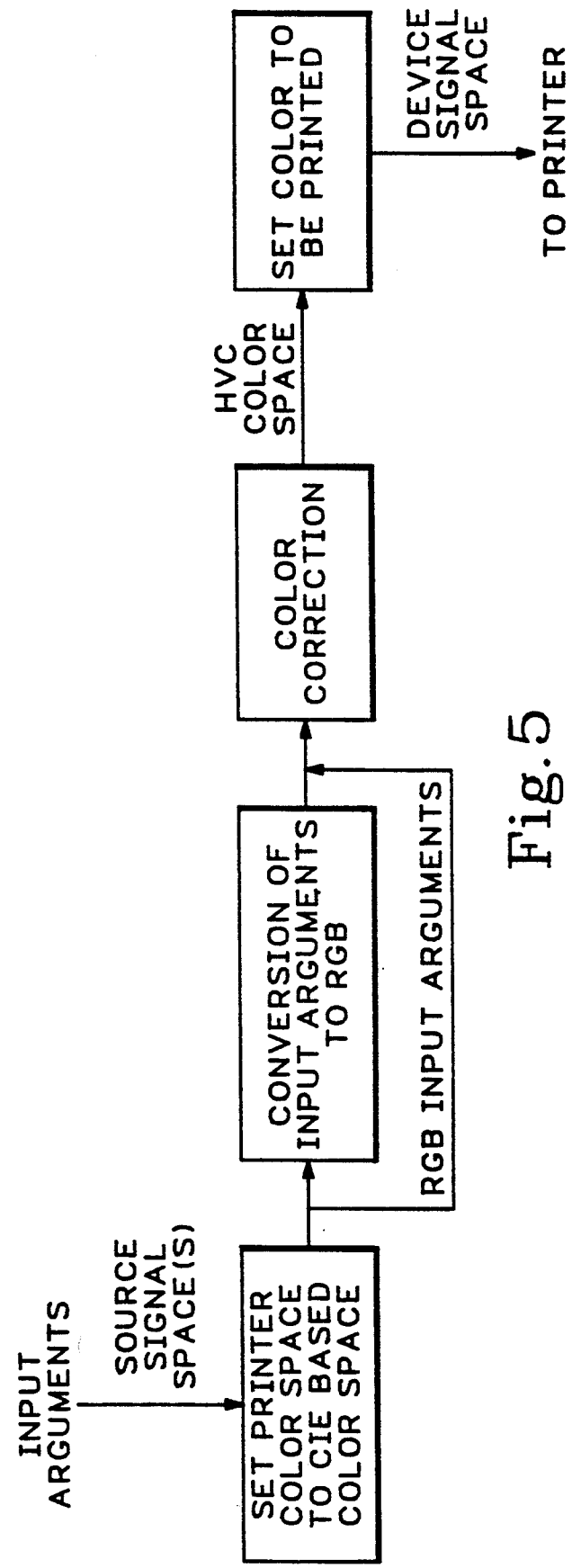
FIG. 5 illustrates a simplified flow diagram showing the color processing system of the present invention in a PostScript ® interpretive device.

Specialized color processing manipulations cannot be directly implemented with PSL1 applications, however, because Level 1 applications do not utilize an objective, CIE-based color space. An additional feature of the color processing system of the present invention is illustrated schematically in FIG. 5 and involves overriding certain PostScript ® commands in order to use PSL2 flexibility and color processing capabilities for PSL1 applications. This aspect of the present invention adds an additional command level which directs PSL1 input through PSL2 processing and allows specialized color processing to take place.

For each of the PostScript® commands that specifies a color to be printed, a new PostScript® instruction of the same name is created. The new instruction is registered in a higher level PostScript® command dictionary than that of the procedure it is intended to replace. Since PostScript® searches command dictionaries sequentially from higher to lower command levels, the PostScript® command that is executed corresponds to the command found in the highest level (i.e., first encountered) command dictionary. Consequently, new instructions override those of the original command of the same name.

In general terms, the new instructions convert color values specified in a device-dependent system such as RGB to CIE-based color space. Color processing according to the present invention may then be implemented as permitted by the PSL2 language in PSL1 applications. PSL1 commands that specify colors include "setrgbcolor," "sethsbcolor," "setcmykcolor," "setgray," "image" and "colorimage," as shown in FIG. 4. These commands may be overridden in accordance with the present invention in the manner set forth below.

The original "setrgbcolor" command receives three arguments (r,g,b) that describe the color that the PostScript® application specifies as red, green and blue components. The override functions as follows:

(1) The printer's color space is set to CIE-basedABC; and (2) A PSL2 "setcolor" command is issued with the R, G and B values as arguments to pass the RGB color through the color processing system of the present invention and set the color to be printed to the color output from the color processing system.

The original "sethsbcolor" command receives three arguments (h, s and b) that describe the color that the PostScript® application specifies as hue, saturation and brightness components. The override functions as follows:

(1) The printer's color space is set to CIE-basedABC;

(2) h, s and b values are converted into R, G and B values representing the same color; and (3) A PSL2 "setcolor" command is issued with the R, G and B values as arguments to pass the RGB color through the color processing system of the present invention and set the color to be printed to the color output from the color processing system.

The original "setcmykcolor" command receives four arguments (C, M, Y and K) that describe the color that the PostScript® application specifies as cyan, magenta, yellow and black components. The override functions as follows:

(1) The printer's color space is set to CIE-basedABC;

(2) C, M, Y and K values are converted into a set of R, G and B values representing the same color; and (3) A PSL2 "setcolor" command is issued with the R, G and B values as arguments to pass the RGB color through the color processing system of the present invention and set the color to be printed to the color output from the color processing system.

The original "setgrey" command receives one argument (g) that describes the grey level that the PostScript® application designates. The override functions as follows:

(1) The printer's color space is set to CIE-basedA; and (2) A PSL2 "setcolor" command is issued with the g value as an argument to pass the grey level through the color processing system of the present invention and set the color to be printed to the color output from the color processing system.

The original "image" command produces grey scale raster images using grey scale raster data. The override functions as follows:

(1) The printer's color space is set to CIE-basedA; and (2) The grey level raster data is supplied to an image command operating in CIE-basedA color space, so that the desired grey levels are passed through the color processing system of the present invention and the color to be printed is set to the color output from the color processing system.

The original "colorimage" command produces color raster images using raster data supplied as grey levels, RGB values or CMYK values. The override functions as follows:

(1) The printer's color space is set to CIE-basedABC;

(2) The color or grey level raster data supplied to the colorimage command is converted into a set of R, G and B raster data values representing the same colors; and (3) The R, G and B raster data is supplied to an image command operating in CIE-basedABC color space, so that the desired color values are passed through the color processing system of the present invention and the colors to be printed are set to the color output from the color processing system.

The reference in each of the override commands to passing values through the color processing system indicates that these procedures provide the color rendering dictionaries needed to complete PostScript® image processing. A plurality of sub-dictionaries may be provided to permit a user to select a color rendering that will conform most closely to his or her color output expectations, the advantages conferred by the color processing system of the present invention can be utilized in PSL1 applications that otherwise would not permit such processing.

The adaptation described above may be incorporated in a software utility product included, e.g., with PSL2-based printers. The software utility product downloads appropriate codes to reprogram the PSL2 interpreter to translate PSL1 operators as specified above.

While in the foregoing specification this invention has been described in relation to certain preferred embodiments thereof, and many details have been set forth for purposes of illustration, it will be apparent to those skilled in the art that the invention is susceptible to additional embodiments and that certain of the details described herein may be varied considerably without departing from the basic principles of the invention.

We claim:

1. A color processing system which converts a device-dependent input signal from a first device into a color output of a second device, the system comprising:

a color mapper that converts the device-dependent input signal into standardized, perceptually uniform color information, the color mapper utilizing tack points and generating corresponding conversion matrices, the tack points establishing a correspondence between the color input signal and an output color designated in the perceptually uniform color information and entailing a use of at least three tack points, the generating of the corresponding conversion matrices entailing a generation of matrices for sectors of the color information bounded by four tack points, and the device-dependent input signal conversion into standardized, perceptually uniform color information entails matrix multiplication of the device-dependent input signal and the conversion matrix corresponding to the sector of the color information in which the input signal is located; and a gamut mapper that converts the color information into a device-dependent output signal, the color output generated in accordance with the device-dependent output signal exhibiting enhanced color characteristics.

2. A color processing system according to claim 1 for converting RGB input signals into CMYK color output, wherein at least eight tack points are selected which include primary colors, secondary colors, white and black.

3. A color processing system according to claim 2 wherein each sector is bounded by four tack points including the white tack point (W) and the black tack point (K), thereby forming a KWRY sector, a KWYG sector, a KWGC sector, a KWCB sector, a KWBM sector and a KWMR sector where R, Y, G, M, C and B respectively constitute red, yellow, green, magenta, cyan and blue tack points.

4. A color processing system according to claim 3 wherein the standardized, perceptually uniform color information is represented in PQV color space.

5. A color processing system according to claim 1, wherein the tack points are user-selected tack points.

6. A color processing system that receives from a first device an RGB color input signal and converts it into a CMYK color output of a second device, the system comprising:

a color mapper that converts the RGB color input signal into standardized, perceptually uniform color information defined in a PQV color space, the color mapper utilizing tack point selection and generating corresponding conversion matrices, the tack point selection establishing a correspondence between the RGB color input signal and an output color designated in the PQV color space and entailing a selection of at least eight tack points that include primary colors, secondary colors, white and black, and the generating of corresponding conversion matrices entailing a generation of matrices for sectors of the PQV color space corresponding to a volume bounded by four tack points including the white tack point (W) and the black tack point (K), thereby forming a KWRY sector, a KWYG sector, a KWGC sector, a KWCB sector, a KWBM sector and a KWMR sector, where R, Y, G, M, C and B constitute respective red, yellow, green, magenta, cyan and blue tack points, and the generated conversion matrices corresponding to the KWRY, KWGC and KWBM sectors are similar in PQV color space and for the KWRY sector, comprise:

| $P_r$ | $P_y$-$P_r$ | $P_w$-$P_y$ |
| $Q_r$ | $Q_y$-$Q_r$ | $Q_w$-$Q_y$ |
| $V_r$ | $V_y$-$V_r$ | $V_w$-$V_y$ | and the RGB color input signal conversion into PQV color space information entails matrix multiplication of the RGB color input signal and the conversion matrix corresponding to the sector of the PQV color space in which the input signal is located; and a gamut mapper that converts the PQV color space information into a CMYK color output signal, the color output generated in accordance with the CMYK color output signal exhibiting enhanced color characteristics.

7. A color processing system according to claim 6 wherein conversion matrices corresponding to the KWYG, KWCB and KWMR sectors are similar in PQV color space and, as shown for the KWYG sector, comprise:

| $P_y$-$P_g$ | $P_g$ | $P_w$-$P_y$ |
| $Q_y$-$Q_g$ | $Q_g$ | $Q_w$-$Q_y$ |
| $V_y$-$V_g$ | $V_g$ | $Q_w$-$Q_y$ |

8. A color processing system that receives from a first device an input signal and converts it into a color output of a second device, the system comprising:

a color mapper that converts a device-dependent input signal into standardized, perceptually uniform color information; and a gamut mapper that converts the perceptually uniform color information into a device-dependent output signal, the gamut mapper comprising hue mapping to convert an input hue signal into an output hue and chroma/value mapping to convert an input chroma/value signal to an output chroma/value, the hue mapping entailing hue circle partitioning to establish a correspondence between input hues and endpoints of hue circle portions designated in a perceptually uniform color space, identifying the hue circle portion in which an input hue is located, and applying a weighting function to determine an output hue corresponding to the input hue within the identified hue circle portion;

whereby the color output generated in accordance with the device-dependent output signal exhibits enhanced color characteristics.

9. A color processing system according to claim 8 wherein the gamut mapping is conducted in an HVC polar coordinate color space.

10. A color processing system according to claim 8 wherein the hue circle is partitioned into six 60 degree portions.

11. A color processing system according to claim 8 wherein the weighting function comprises a linear interpolation within the hue circle portion.

12. A color processing system according to claim 8 wherein the output hue is calculated using the formula:

$$h_{out} = w[a](t) * (h_{tout}[b] - h_{tout}[a]) + h_{tout}[a]$$

wherein w(a) (t) is a weighting function at a hue circle portion endpoint a, $h_{tout}[a]$ is an output hue value at the hue circle portion endpoint a, $h_{tout}[b]$ is an output hue value at a hue circle portion endpoint b and t is calculated using the formula:

$$t = (h_{in} - h_{tin}[a])/(h_{tin}[b] - h_{tin}[a])$$

wherein $h_{in}$ is an input hue, $h_{tin}[a]$ is an input hue at the hue circle portion endpoint a, and $h_{tin}[b]$ is an input hue at the hue circle portion endpoint b.

13. A color processing system according to claim 8 wherein the chroma/value mapping comprises companding.

14. A color processing system according to claim 8, further comprising multiple hue mapping protocols, thereby permitting a user to choose the hue mapping protocol employed in each operation of the color processing system to more closely match the color output with the aesthetic expectations of the user.

15. A color processing system according to claim 8, further comprising multiple value/chroma mapping protocols, thereby permitting a user to choose the value/chroma mapping protocol employed in each operation of the color processing system to more closely match the color output with the aesthetic expectations of the user.

16. A color processing system for use with a Post-Script ® Level 2 interpreter to convert an input signal from a first device into a color output of a second device, the system comprising:
 a user-selectable library of color rendering dictionaries including Blue Adjust, Simulate Video, or Simulate Press;
 a color mapper that converts the input signal into standardized, perceptually uniform color information; and
 a gamut mapper that converts the perceptually uniform color information into a device-dependent output signal,
 whereby the color mapper and the gamut mapper cooperate with the user-selected color rendering dictionary to provide the device-dependent color output signal such that the color output of the second device exhibits enhanced color characteristics closely matching the user's aesthetic expectations.

17. A color processing system according to claim 16 wherein Post-Script ® Level 2 functions may be conducted using Post-Script ® Level 1 by overriding Post-Script ® Level 1 commands which specify color to provide a standardized, perceptually uniform color space for processing.

18. A color processing system according to claim 17 wherein the Post-Script ® Level 1 command which is overridden is selected from the group comprising setrgbcolor, sethsbcolor, setcmykcolor, setgray, image and colorimage.

* * * * *